United States Patent
Spitzer et al.

(10) Patent No.: US 6,182,619 B1
(45) Date of Patent: Feb. 6, 2001

(54) TWO-STROKE DIESEL ENGINE

(75) Inventors: Jeffrey J. Spitzer, Ramona; Clifford A. Manzke, San Diego, both of CA (US)

(73) Assignee: General Atomics Aeronautical Systems, Inc., San Diego, CA (US)

(*) Notice: Under 35 U.S.C. 154(b), the term of this patent shall be extended for 0 days.

(21) Appl. No.: 09/219,964

(22) Filed: Dec. 24, 1998

(51) Int. Cl.⁷ .................................................. F02B 25/08
(52) U.S. Cl. ..................................... 123/51 B; 123/51 BA
(58) Field of Search ........................... 123/51 B, 51 BD, 123/51 BA, 193.5

(56) References Cited

U.S. PATENT DOCUMENTS

| | | | |
|---|---|---|---|
| 1,972,335 | * 9/1934 | Gardner | 123/51 B |
| 1,976,630 | * 10/1934 | Pescara | 123/51 B |
| 2,065,046 | * 12/1936 | Bronander | 123/51 B |
| 2,140,397 | * 12/1938 | Alfaro | 123/51 B |
| 2,244,323 | * 6/1941 | Antonsen et al. | 123/51 B |
| 2,408,030 | * 9/1946 | Beale | 123/51 B |
| 4,030,471 | 6/1977 | Ginkel . | |
| 4,169,436 | 10/1979 | Welch et al. . | |
| 4,257,365 | 3/1981 | Noguchi et al. . | |
| 4,367,715 | 1/1983 | Watson . | |
| 4,732,115 | * 3/1988 | Lapeyre | 123/51 B |
| 4,856,463 | * 8/1989 | Johnston | 123/51 BA |
| 4,905,637 | 3/1990 | Ott . | |
| 4,977,864 | 12/1990 | Grant . | |
| 5,042,441 | * 8/1991 | Paul et al. | 123/51 BA |
| 5,058,536 | * 10/1991 | Johnston | 123/51 BA |
| 5,058,537 | * 10/1991 | Paul et al. | 123/51 BA |
| 5,375,567 | 12/1994 | Lowi, Jr. . | |
| 5,507,253 | 4/1996 | Lowi, Jr. . | |

* cited by examiner

*Primary Examiner*—John Kwon
(74) *Attorney, Agent, or Firm*—Nydegger & Associates

(57) ABSTRACT

A two-stroke, opposed piston, diesel engine is provided herein. The engine includes a thermal shield and a fluid gap which surround the exhaust ports to shield the engine block from an exhaust fluid from the cylinder assembly. Additionally, a cooling fluid is transferred to a plurality of helical shaped passageways which encircles the cylinder housing. These features allow the engine to operate at a cooler temperature and allow for more uniform cooling of the engine. Preferably, the engine also includes a first injector which injects a combustion fluid into the cylinder chamber between the pistons in the same direction as a swirl created within the cylinder chamber. This increases the distribution of the combustion fluid in the cylinder chamber and enhances the efficiency of the engine.

20 Claims, 5 Drawing Sheets

TWO-STROKE DIESEL ENGINE

FIELD OF THE INVENTION

The present invention relates to a two-stroke cycle diesel engine having improved performance characteristics. More particularly, the present invention relates to an opposed piston, two-stroke cycle diesel engine which is adapted for use in small, unmanned aircraft.

BACKGROUND

Opposed piston, two-stroke cycle diesel engines have been in development for a number of years. Theoretically, due to its configuration, an opposed piston, two-stroke cycle diesel engine should generate more power than a comparable sized four-stroke diesel engine. This is so because the two-stroke cycle engine has twice as many power cycles per revolution as does the four-stroke cycle engine.

In order to maximize the benefit of an opposed piston, two-stroke cycle diesel engine, it is desirable to make the engine as compact as possible. As a high output engine is made very compact, however, cooling becomes difficult and can pose serious concerns. This happens because an excessive amount of heat is generated within a confined area, and there is very little room in this confined area for coolant to pass through the engine. Furthermore, if the cooling system design is compromised as a trade-off to compactness, uneven cooling or inadequate cooling can result and lead to premature failure of the engine.

In order to maximize thermal efficiency, in addition to effective cooling, it is also desirable to reduce heat transfer and thereby retain as much heat as possible in the exhaust stream. This is particularly desirable when heat in the exhaust stream can be subsequently used to maximize turbocharger output. The reduction of heat transfer is more difficult in the opposed piston engine than in the more conventional four-stroke engine because the exhaust ports are located all around the cylinder chamber. The exhaust gases must therefore be redirected in order to exit the engine block on the sides. Redirecting the flow without some means of minimizing heat transfer, however, will increase the cooling problem previously mentioned and simultaneously reduce the amount of heat retained for transfer to the turbocharger.

It is also of some concern that, present opposed piston, two-stroke diesel engines suffer from incomplete fuel combustion within the cylinder chamber. Because of the opposed piston design, the fuel injector is not able to inject the combustion fuel to the top center of the pistons. Instead, the fuel injectors must inject from a cylinder wall. Presently, existing designs are not able to effectively mix and/or distribute the fuel within the cylinder chamber. Frequently, in order to improve the fuel combustion, some existing diesel two-stroke engines are initiating a strong swirl within the cylinder chamber to enhance the removal of the exhaust fluid from the cylinder chamber. However, the strong swirl can subsequently inhibit the propagation of the diesel within the cylinder chamber and cause incomplete fuel combustion within the cylinder chamber. This has minimized the efficiency of these engines.

In light of the above, it is an object of the present invention to provide an opposed piston, two-stroke cycle diesel engine which operates more efficiently, is more durable and is more reliable than existing engines. Another object of the present invention is to provide an opposed piston, two-stroke cycle diesel engine having an improved cooling system and thermal shields which allow the engine to operate at a cooler temperature. Still another object of the present invention is to provide a two-stroke diesel engine having improved fuel ignition and combustion characteristics.

SUMMARY

The present invention is directed to an engine which satisfies these needs. In one embodiment, the engine includes a tubular cylinder housing which is formed with a plurality of exhaust ports. The cylinder housing itself is mounted in an engine block which at least partly encircles the cylinder housing. First and second axially opposed pistons are positioned in the cylinder housing, and a thermal shield surrounds the exhaust ports to at least partly shield the engine block from exhaust fluid as it exits from the cylinder housing through the exhaust ports. As provided in detail below, because the thermal shield acts to isolate the engine block from the exhaust fluid, the engine block operates at a cooler temperature and requires less cooling. Further, this allows the exhaust fluid to be transferred to a turbocharger at a hotter temperature.

In more detail, the cylinder housing includes a cylinder wall which defines a cylinder chamber. The plurality of exhaust ports are arranged circumferentially and extend through the cylinder wall to release the exhaust fluid from the cylinder chamber. As intended for the present invention, the opposed pistons are adapted to move axially within the cylinder chamber between a first configuration in which the pistons are spaced apart from each other, and a second configuration in which the pistons are proximate each other. In the second configuration the exhaust ports are closed and the pistons act to compress air in the cylinder between the pistons. The compressed air thereby ignites fuel as it is injected into the cylinder between the pistons. The resultant ignition then drives the pistons to the first configuration wherein the exhaust ports are opened. It is while the pistons are in this first configuration that air is forced into the cylinder chamber to replenish air in the chamber and to drive exhaust fluids out of the cylinder chamber through the exhaust ports. The pistons then return to the second configuration and the cycle is repeated.

In order to help isolate the engine block from the heat of the exhaust fluid, the thermal shield is positioned to at least partly encircle the cylinder housing around the exhaust ports. Specifically, the thermal shield is positioned between at least one of the exhaust ports and the engine block to thermally shield the engine block from the exhaust fluid. Preferably, the thermal shield is positioned between substantially all of the exhaust ports and the engine block to thermally shield the engine block from the exhaust fluids. This minimizes the heat transfer from the exhaust fluid to the engine block and allows the engine block to operate at a cooler temperature with less requirement for cooling.

As intended for the present invention, the engine includes a sealed fluid gap which is located between the thermal shield and the engine block to reduce heat transfer from the exhaust to the engine block. The sealed fluid gap substantially encircles the cylinder housing and the thermal shield.

In order to provide efficient cooling for the engine, the engine can include cooling passageways which are substantially annular and engineered to effectively encircle each cylinder housing. As provided herein, each cooling passageway around each cylinder housing can be divided into annular sections. These include: a first cooling section, a grooved cooling section, and a second cooling section. Importantly, each of these cooling sections includes at least one cooling fluid inlet which delivers a cooling fluid to the respective cooling sections from a direction that is substantially tangential to the cylinder housing. As provided herein, because each cooling section is annular and the cooling inlet delivers the cooling fluid substantially tangentially, the cooling fluid encircles and spins around the cylinder housing. This promotes uniform cooling, minimizes areas of flow separation, and enhances the heat exchange between the cylinder housing and the cooling fluid.

Preferably, each cooling section also includes at least one cooling fluid outlet which is adapted and oriented to receive the cooling fluid for removal from the respective cooling section in a direction that is substantially tangential to the cylinder housing. This allows for a smooth transition of the spinning cooling fluid out the respective cooling sections.

As intended for the present invention, the first and second cooling sections are essentially unobstructed fluid channels which allow the cooling fluid to bathe the surface of the cylinder housing. On the other hand, the grooved cooling section, which is between the first and second cooling stations, includes at least one helical shaped passageway which is formed by protruding ribs. More preferably, there are a plurality of helical shaped passageways which substantially encircle the cylinder housing in the area of the grooved cooling section. The purpose of the helical shaped passageways is twofold. First, these helical passageways effectively distribute the cooling fluid for uniform cooling of the cylinder housing. Further, the helical shaped passageways minimize areas of flow separation from the cylinder housing. Second, the ribs which form the helical passageways provide reinforcement for the cylinder housing in the region where ignition produces the greatest forces on the housing. The ribs may extend to allow the cylinder housing to receive additional support from the engine block. This allows the cylinder housing to be contained to minimal expansion and at a substantially uniform rate to keep the cylinder housing substantially round. These two benefits minimize friction and local hot spots in the cylinder wall as well as improving the durability of the piston rings.

The engine also includes a first injector that is adapted to inject the combustion fluid into the cylinder chamber between the pistons. Some existing diesel two-stroke engines are initiating a strong swirl within the cylinder chamber to enhance the removal of the exhaust fluid from the cylinder chamber. However, the strong swirl can subsequently inhibit the propagation of the combustion fluid within the cylinder chamber and cause incomplete fuel combustion within the cylinder chamber. Importantly, with the present invention, the first injector includes a nozzle which directs the combustion fluid in the cylinder chamber in the same direction as the swirl.

As provided herein, the first injector can direct the combustion fluid at an angle in the range between approximately thirty degrees (30°) and ninety degrees (90°) relative to a tangent to the cylinder housing at the point where the first injector enters the cylinder housing. More preferably, the first injector can include two holes which direct the combustion fluid at approximately a sixty degree (60°) angle and a eighty degree (80°) angle relative to the tangent of the cylinder housing where the first injector enters the cylinder housing. Because, the combustion fuel is injected into the swirl, the swirl assists in distributing the combustion fuel throughout the cylinder chamber. The injection of the fuel in the direction of the swirl enhances the swirl further aiding fuel distribution. This enhances combustion within the cylinder chamber and improves performance of the engine.

Preferably, the engine also includes a second injector which is positioned diametrically opposite the first injector. The second injector can also include a nozzle for directing the combustion fluid in the direction of the swirl in the cylinder chamber. Because, the combustion fuel is directed with the swirl, the swirl assists in distributing the combustion fuel throughout the cylinder chamber.

Importantly, the opposed piston, two-stroke cycle diesel engine provided herein has an improved cooling system which allows the engine to operate at a cooler temperature and improved fuel ignition and combustion characteristics. This allows the engine to be more durable and more reliable than existing opposed piston, two-stroke cycle diesel engines.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
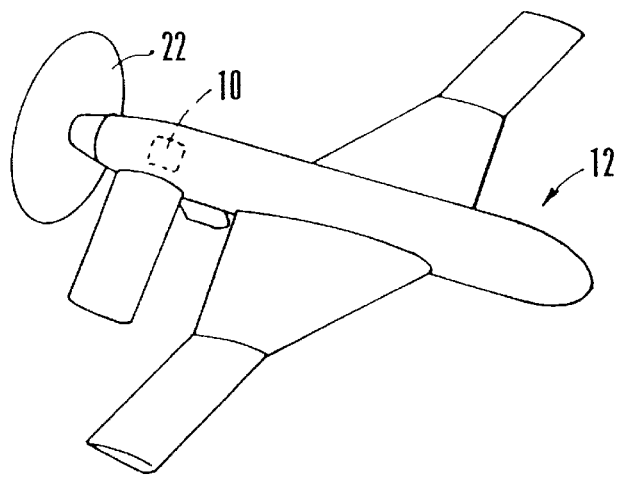
FIG. 1A is a perspective view of an airplane including an engine (in phantom) having features of the present invention.
Figure 1B:
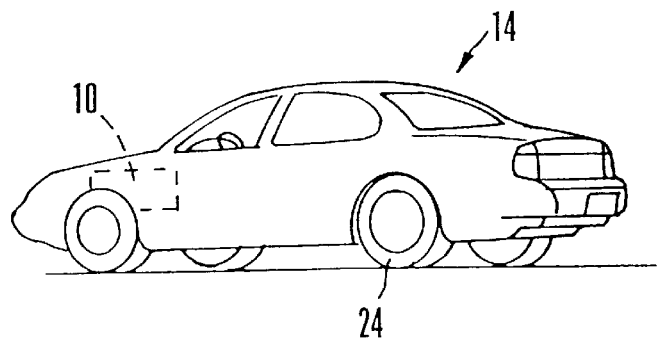
FIG. 1B is a perspective view of an automobile including an engine (in phantom) having features of the present invention.

A two-stroke engine 10 having features of the present invention is shown positioned in an airplane 12 in FIG. 1A and in an automobile 14 in FIG. 1B. However, those skilled in the art will recognize that the engine 10 can be used for other purposes. The engine 10 is powered by a combustion fluid, such as diesel. However, it is to be appreciated that the engine 10 may be operational with other combustible fluids such as jet fuel, natural gas, gasoline or propane. As provided herein, the present two-stroke engine 10 has improved performance characteristics and relatively high power output.

A detailed description of the various components of a two-stroke cycle, opposed piston engine is provided in U.S. Pat. No. 4,257,365, issued to Noguchi et al. The contents of U.S. Pat. No. 4,257,365 are incorporated herein by reference. Accordingly, only the structural aspects of an opposed piston engine 10 which are particularly significant to the present invention are provided herein.

Figure 2:
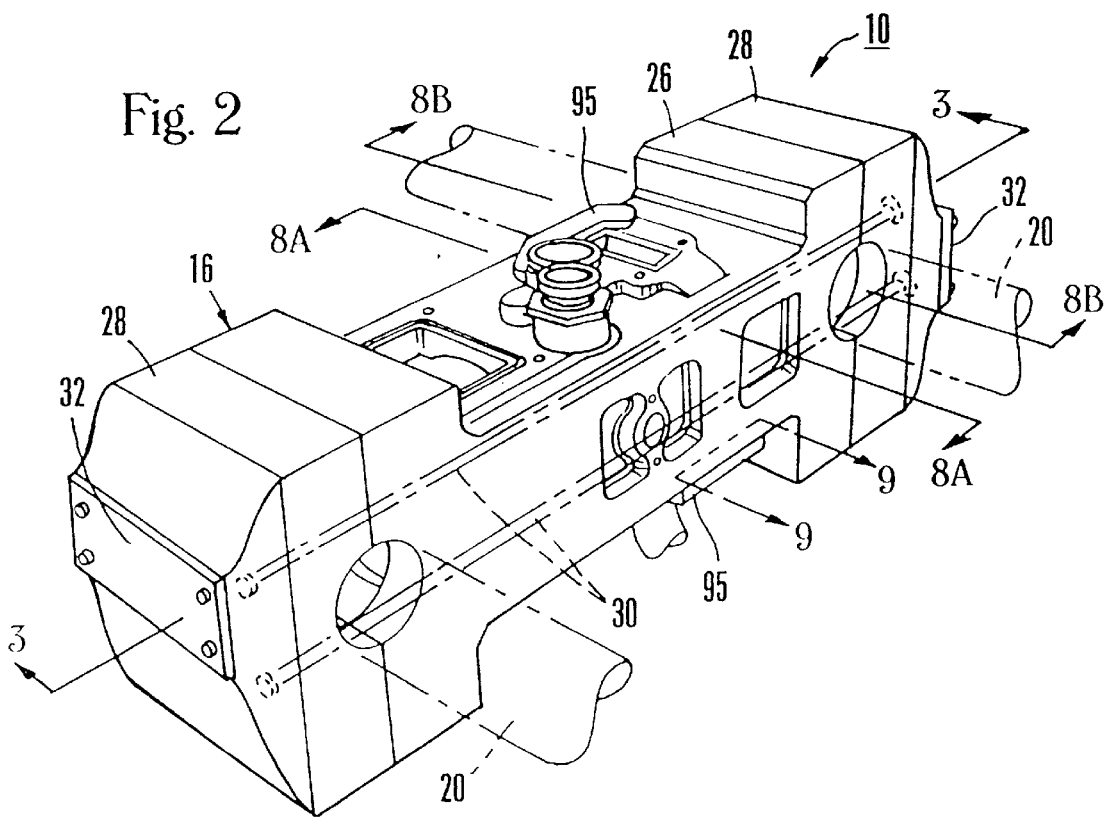
FIG. 2 is a perspective view of an engine block for an engine having features of the present invention.
Figure 3:
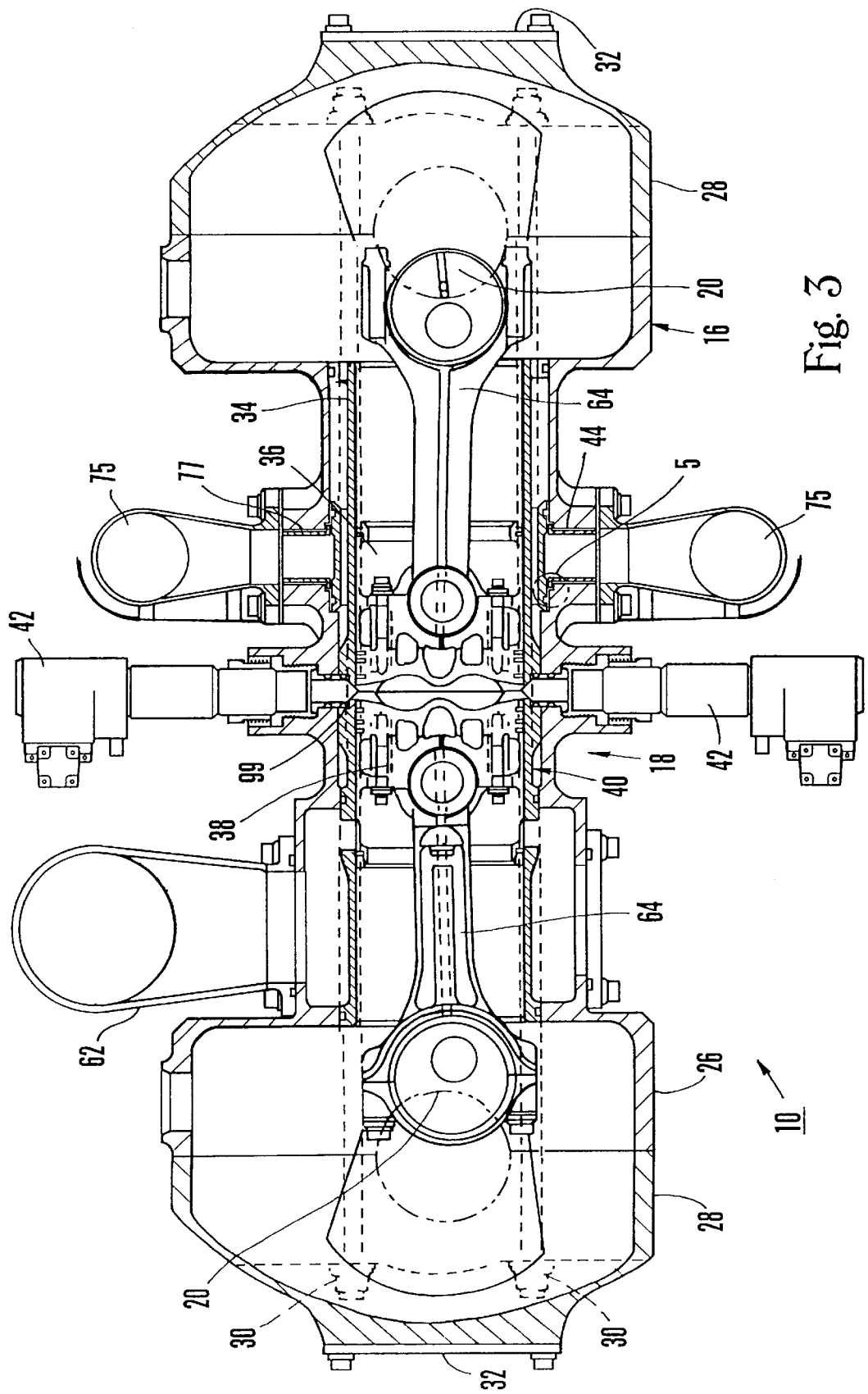
FIG. 3 is a cross-sectional view of the cylinder assembly of the engine of the present invention as seen along the line 3—3 in FIG. 2 with peripheral components added for completeness.

Referring now to FIGS. 2 and 3, the engine 10 includes an engine block 16 which encloses a cylinder assembly 18 (shown in FIG. 3) and retains the components of the cylinder assembly 18 together. The design of the engine block 16 can vary according to the specific design requirements of the engine 10. In the embodiment provided in the drawings, the engine block 16 is generally rectangular and encloses one cylinder assembly 18. Utilizing this design, a plurality of separate engine blocks 16 can be attached together to form an engine 10 having a plurality of cylinder assemblies 18. Alternately, a single engine block (not shown) can be enlarged to enclose a plurality of cylinder assemblies.

As shown in FIG. 2, a pair of spaced apart crankshafts 20 (shown in phantom) extend through engine block 16 on opposite sides of the engine block 16. The crankshafts 20 are rotatably attached to the engine block 16 by bearings (not shown). The crankshafts 20 can subsequently be connected to a drive shaft (not shown) which rotates, for example, a propeller 22 (FIG. 1A) for an aircraft 12 or wheels 24 of the automobile 14. The engine block 16 shown in FIG. 2 also includes a block body 26 which separates a pair of opposed end caps 28 that are retained together by four, spaced apart cap bolts 30 (only two are shown) which extend between the end caps 28. Additionally, each end cap 28 includes an end plate 32 which provides access to the cylinder assembly 18.

As indicated above, the number of cylinder assemblies 18 which are incorporated into the engine 10 can be varied according to the desired power output of the engine 10. Referring to FIG. 3, each cylinder assembly 18 includes a cylinder housing 34, a first piston 36, a second piston 38, a cooling passageway 40, at least one injector 42, and a thermal shield 44.

Figure 4:
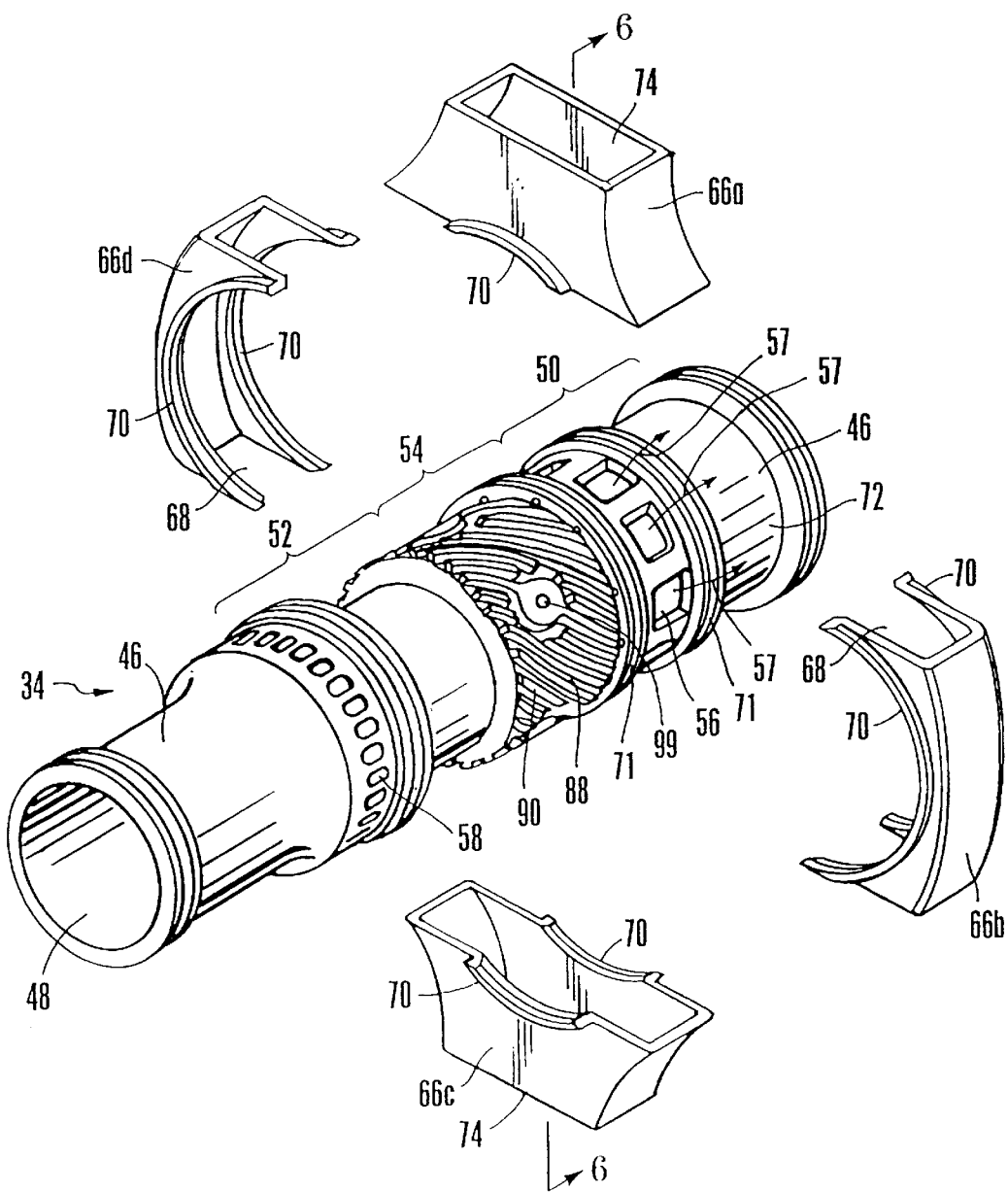
FIG. 4 is an exploded, perspective view of a cylinder housing and thermal shield of the present invention.
Figure 5:
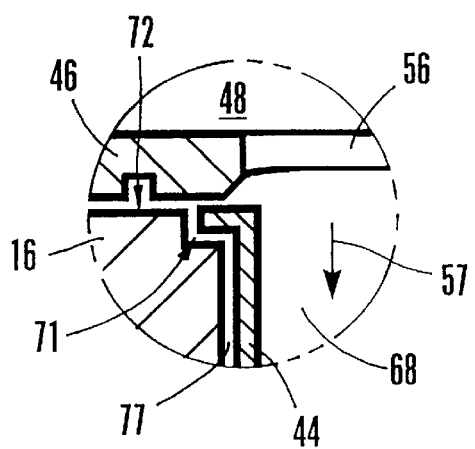
FIG. 5 is an enlarged view taken on Line 5 in FIG. 3.
Figure 6:
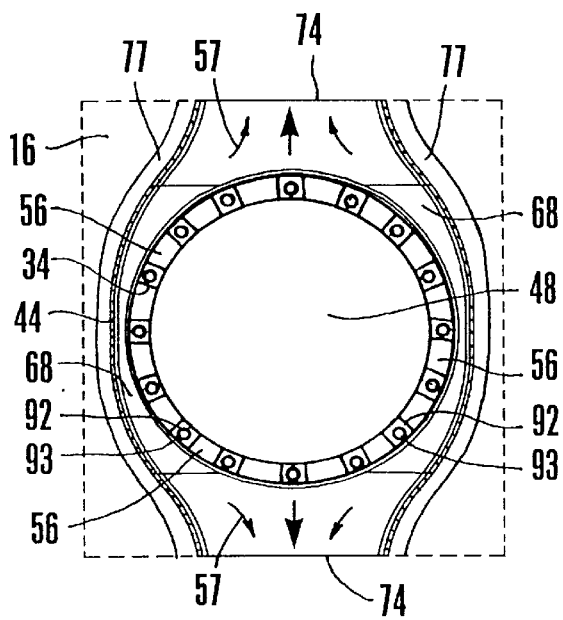
FIG. 6 is a cross-sectional view of the thermal shield joined to the cylinder housing and the engine block as would be seen along the line 6—6 in FIG. 4.
Figure 7:
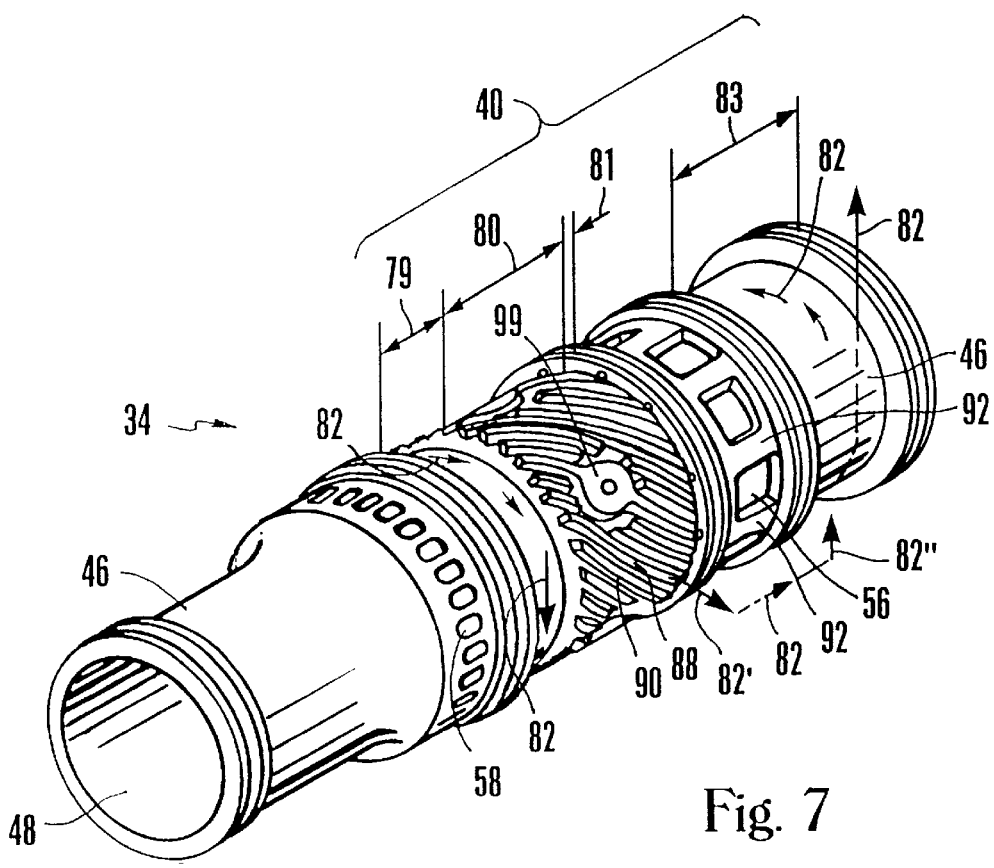
FIG. 7 is a perspective view of the cylinder housing including arrows which represent the flow direction of cooling fluid around the cylinder housing.

As can best be seen with reference to FIGS. 4 and 7, the cylinder housing 34 is substantially tubular and includes a cylinder wall 46 which defines a substantially cylindrical shaped cylinder chamber 48. For ease of discussion, the cylinder housing 34 is divided into three sections, namely, an exhaust section 50, an intake section 52, and an injector section 54 therebetween. A plurality of spaced apart exhaust ports 56 which are circumferentially oriented on the cylinder housing 34 and which extend substantially transversely through the cylinder wall 46 to release exhaust fluid (shown by arrows 57 in FIGS. 4–7) from the cylinder chamber 48. The exhaust ports 56 are positioned around a circumference of the cylinder housing 34 in the exhaust section 50 of the cylinder housing 34 substantially as shown in FIGS. 4 and 7.

Somewhat similarly, a plurality of spaced apart inlet ports 58 are positioned around the circumference of the cylinder housing 34 in the intake section 52 (see FIG. 4). As known by those skilled in the art, the inlet ports 58 can extend through the cylinder wall 46 at an angle which is inclined toward a tangential direction relative to the cylinder chamber 48. This causes the incoming scavenge fluid (shown by the arrows 60 in FIG. 10) to swirl within the cylinder chamber 48. This enhances the forcing of the exhaust fluid (shown by arrows 57) from the cylinder chamber 48 through the exhaust ports 56. In particular, the rotational direction of the swirl (shown by arrows 60) depends upon the design of the engine 10. For example, the swirl can be in either the clockwise direction or the counterclockwise direction. In order to direct forced air into the cylinder chamber 48, the inlet ports 58 can be connected with an inlet manifold 62 (shown in FIG. 3) which, in turn, is connected to an inlet pump (not shown) to supply a pressurized scavenge fluid 60 to the chamber 48 through inlet ports 58.

Referring back to FIG. 3, the pistons 36, 38 are substantially opposed and positioned within the cylinder chamber 48. The pistons 36, 38 are each connected with a connecting member 64 to one of the crankshafts 20. The pistons 36, 38 are adapted to move between a first position in which the pistons are spaced apart and a second position in which the pistons 36, 38 are proximate each other. It should be recognized that the movement of the first piston 36 within the cylinder chamber 48, selectively opens and closes the exhaust ports 56, while movement of the second piston 38 within the cylinder chamber 48 selectively opens and closes the inlet ports 58.

Importantly, the present invention minimizes the heat transfer between the exhaust fluid (shown by arrows 57) and the engine block 16 by incorporating a thermal shield 44. This is done to minimize the cooling requirements of the engine block 16. As provided herein, the thermal shield 44 is positioned between the exhaust ports 56 and the engine block 16 in order to prevent the hot exhaust fluid (shown by arrows 57) from directly impinging upon the engine block 16. As indicated above, in addition to minimizing the cooling requirements for engine block 16, the use of the thermal shield 44 allows for higher temperature exhaust fluid to be transferred to a turbocharger (not shown). This increases the performance of the engine 10 and the durability of the engine 10.

In the embodiment shown in the Figures, the thermal shield 44 encircles the cylinder housing 34 around the exhaust ports 56 and is positioned between the exhaust ports 56 and the engine block 16 to thermally shield the engine block 16 from the exhaust fluid 57. As shown in FIG. 4, for ease of assembly, the thermal shield 44 can consist of four separate shield segments 66a, 66b, 66c, 66d which combine together to encircle the cylinder housing 34. As perhaps best appreciated by cross referencing FIGS. 4 and 6, the four shield segments 66a, 66b, 66c, 66d also combine to define an annular exhaust channel 68 which surrounds and is in fluid communication with the exhaust ports 56. With specific reference to FIG. 4, it will be seen that each shield segment 66a, 66b, 66c, 66d includes a pair of spaced apart, curved rails 70 which fit against a pair of shield grooves 71 (see FIG. 5) in a housing inner surface 72 of the engine block 16. As can best be seen with reference to FIG. 4, two of the shield segments 66a, 66b, 66c, 66d include a rectangular shaped shield port 74 for transferring the exhaust fluid (shown by arrows 57) from the exhaust channel 68 to an exhaust manifold 75. FIG. 6 shows the four shield segments 66a, 66b, 66c, 66d surrounding the exhaust ports 56 intermediate to the engine block 16.

The thermal shield 44 can be made of any material which can withstand the high temperatures of the exhaust fluid 57. For example, an excellent thermal shield 44 can be made of stainless steel. Those skilled in the art will recognize other material which can be used for the thermal shield 44.

Preferably, the thermal shield 44 is designed so that a substantially sealed fluid gap 77 exists between the thermal shield 44 and the engine block 16. This gap 77 is filled with air which acts to reduce heat transfer from the exhaust fluid (shown by arrows 57) to the engine block 16. As can best be appreciated with reference to FIGS. 5 and 6, the fluid gap substantially encircles the cylinder housing 34 and the thermal shield 44. Basically, the thermal shield 44 is sized and shaped so that the thermal shield 44 contacts and rests against the cylinder housing 34 and is retained in grooves 71 in engine block 16. Preferably, the shields 44 do not contact engine block 16 anywhere except in these grooves. This minimizes the amount of heat transfer from the exhaust fluid (shown by arrows 57) to the engine block 16 and subsequently minimizes in the engine the cooling requirements of the engine block 16.

Another important feature of the present invention is that each cylinder assembly 18 is designed to be cooled by a separate cooling passageway 40 which each substantially encircles and surrounds each cylinder housing 34. Referring to FIGS. 3, 4 and 7, it will be seen that the cooling passageway 40 is positioned between the engine block 16 and the cylinder housing 34 and that it effectively extends over the exhaust section 50, the injector section 54 and the intake section 52, as shown in FIG. 4. As best seen in FIG. 7, the cooling passageway 40 can be subdivided into sections according to their physical location on the engine 10 and according to their structural characteristics. These sections are: a first end cooling section 79 which is located near the inlet ports 58; a grooved cooling section 80 which is located in the injection section in the center of the cylinder assembly 18 and is across the first cooling section 79 from the inlet ports 58; a transfer cooling section 81 which is located between the grooved cooling section 80 and the exhaust ports 56; and a second end cooling section 83 which is located across the exhaust ports 56 from the transfer cooling section 81. Insofar as the structural characteristics of the cooling sections 79, 80, 81 and 83 are concerned, the first end cooling section 79, the transfer cooling section 81 and the second end cooling section 83 all have generally smooth surfaces over the cylinder housing 34. In contrast with this, the grooved cooling section 80 is characterized by a plurality of helical oriented grooves 88 which are defined and separated by a plurality of ribs 90.

The flow of a coolant fluid through the cooling passageway 40 is indicated by the arrows 82 in FIG. 7. There it will be seen that the fluid coolant enters the first end cooling section 79 from a tangential direction and then flows circumferentially around the cylinder housing 34 through cooling section 79. As additional fluid coolant enters the first end cooling section 79, fluid coolant flows in a direction away from the inlet ports 58 and toward the grooved cooling section 80. Upon entering the grooved cooling section 80, the fluid coolant flows into the grooves 88 between the ribs 90. While in the grooved cooling section 80, the fluid coolant traverses the section 80 and then enters the transfer cooling section 81. Importantly, as the fluid coolant circulates around the cylinder housing 34 through the first end cooling section 79, through the grooved cooling section 80 and through the transfer cooling section 81, it travels in generally the same rotational direction relative to the cylinder housing 34. As the fluid coolant leaves the transfer cooling section 81, however, it can follow either of two different paths.

One path the fluid coolant can take when passing from the transfer cooling section 81 to the second end cooling section 83 is via the transfer conduits 92 which separate and define the exhaust ports 56. As perhaps best appreciated by cross referencing FIG. 6 with FIG. 7, the transfer conduits 92 are each formed with a transfer channel 93 which allows fluid coolant to flow directly from the transfer cooling section 81 to the second end cooling section 83.

Figure 8A:
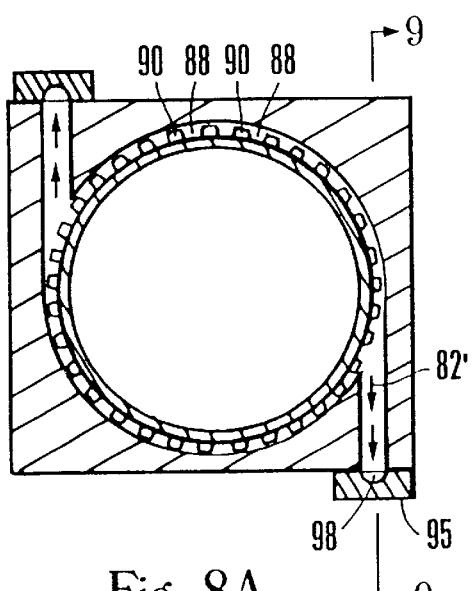
FIG. 8A is a cross-sectional view of the cylinder housing and coolant bypass taken on Line 8A—8A in FIG. 2.
Figure 8B:
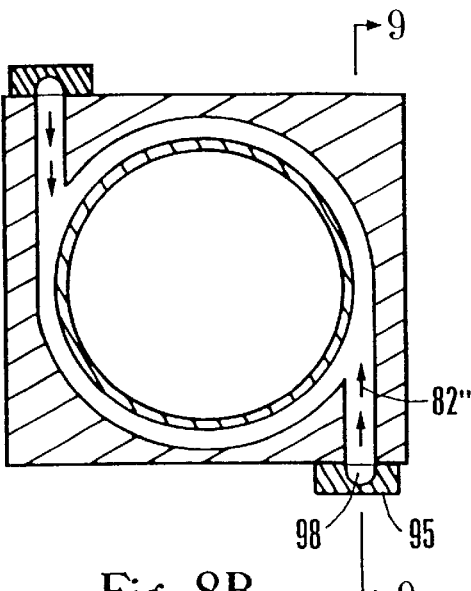
FIG. 8B is a cross-sectional view of the cylinder housing and coolant bypass taken on Line 8B—8B in FIG. 2.
Figure 9:
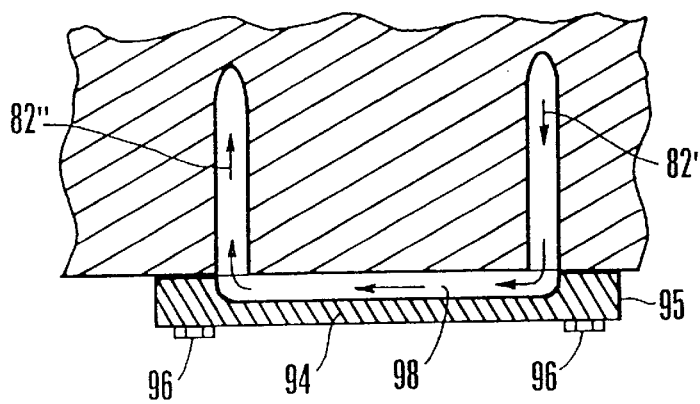
FIG. 9 is a cross-sectional view of the coolant bypass taken on Line 9—9 in FIG. 2.

Another path which the fluid coolant can take when passing through the cooling passageway 40 from the transfer cooling section 81 to the second end cooling section 83 is via a by-pass 95. Such a by-pass 95 is shown in FIG. 2 and, in cross-section, in FIG. 9. As shown, the by-pass 95 is constructed using a plate which is attached to the engine block 16 by means well known in the art, such as plate bolts 96. This by-pass 95 is formed with a channel 98. With this structure, fluid coolant can tangentially exit transfer cooling section 81 (see arrows 82' in FIGS. 7, 8A and 9), cross over the exhaust ports 56 via by-pass channel 98, and tangentially enter the second end cooling section 83 (see arrows 82" in FIGS. 7, 8B and 9). It will be noted that during this transfer from cooling section 81 to cooling section 83, the fluid coolant has changed its direction of rotation over the surface of cylinder housing 34. In a manner well known in the pertinent art, the fluid coolant leaving the second end cooling section 83 is externally cooled and then recycled through the cooling passageway 40. It is to be appreciated that, although the disclosure above has described the flow of coolant from first cooling section 79 toward second cooling section 83, the flow could also have been described in the reverse direction. For purposes of the present invention, either direction for coolant flow is acceptable.

Figure 10:
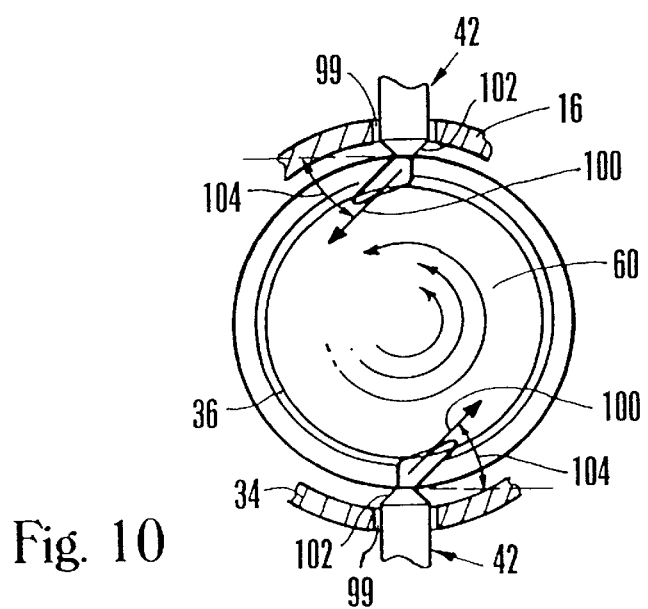
FIG. 10 is a schematic view showing the injectors injecting a combustion fluid into the cylinder housing.

Referring back to FIG. 3, the injectors 42 extend through injection apertures 99 in the cylinder housing 34 to inject the combustion fluid 100 (shown in FIG. 10) into the cylinder chamber 48 between the pistons 36, 38. As provided herein, each injector 42 is designed to direct the combustion fluid 100 in the cylinder chamber 48 in the swirl direction of the scavenge fluid (shown by arrows 60). Referring to FIG. 10, each injector 42 includes a nozzle 102 which is adapted to direct the combustion fluid 100 at an injection angle 104 of between approximately thirty degrees (30°) and ninety degrees (90°) relative to a tangent of the cylinder housing 34 at where the injectors 42 enter the cylinder housing 34. More preferably, each injector 42 is adapted to direct the combustion fluid 100 at an injection angle 104 of between approximately sixty degrees (60°) and seventy-five degrees (75°) relative to a tangent of the cylinder housing 34 where the injectors 42 enter the cylinder housing 34. Because, the combustion fluid 100 is injected in substantially the swirl direction, the swirl assists in distributing the combustion fluid 100 throughout the cylinder chamber 48. This enhances combustion within the cylinder chamber 48 and the performance of the engine 10.

While the particular engine 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A diesel engine comprising:
    a tubular cylinder housing including a cylinder wall which at least partly defines a cylinder chamber, the cylinder housing having an exhaust port which extends through the cylinder wall, the exhaust port being adapted to release exhaust fluid from the cylinder chamber;
    first and second opposed pistons which are adapted to move within the cylinder chamber;
    an engine block which at least partly encircles the cylinder housing proximate the exhaust port; and
    a thermal shield positioned substantially between the exhaust port and the engine block to thermally shield the engine block from the exhaust fluid.

2. The diesel engine of claim 1 including a fluid gap positioned between the exhaust port and the engine block to reduce heat transfer to the engine block.

3. The diesel engine of claim 2 wherein the fluid gap is positioned between the thermal shield and the engine block.

4. The diesel engine of claim 1 wherein the cylinder housing includes a plurality of exhaust ports and the thermal shield substantially encircles the cylinder housing and the exhaust ports, the thermal shield being positioned between substantially all of the exhaust ports and the engine block to thermally shield the engine block from the exhaust fluid.

5. The diesel engine of claim 1 including a cooling passageway having a substantially annular, cooling section which substantially encircles the cylinder housing and a coolant inlet which is adapted for delivering a cooling fluid substantially tangential to the cooling section.

6. The diesel engine of claim 5 wherein the cooling section includes a cooling outlet which is adapted to receive the cooling fluid substantially tangential to the cooling section.

7. The diesel engine of claim 1 including a cooling passageway having a plurality of helical shaped passageways which substantially encircle at least a portion of the cylinder housing.

8. An engine which is adapted to be cooled by a cooling fluid, the engine comprising:
    a tubular cylinder housing defining a cylinder chamber, said cylinder housing including a plurality of exhaust ports which are adapted for releasing an exhaust fluid;
    an engine block which at least partly encircles the cylinder housing proximate the exhaust ports;

a thermal shield positioned substantially between at least one of the exhaust ports and the engine block to thermally shield the engine block from the exhaust fluid; and a cooling passageway including a substantially annular cooling section which substantially encircles the cylinder housing and a cooling inlet which is adapted for delivering the cooling fluid substantially tangential to the cooling section.

9. The engine of claim 8 wherein the cooling passageway includes at least one helical shaped passageway which substantially encircles at least a portion of the cylinder housing and is in fluid communication with the cooling fluid.

10. The engine of claim 9 wherein the helical shaped passageway includes a groove in a housing outer surface of the cylinder housing.

11. The engine of claim 9 including a plurality of helical shaped passageways which substantially encircle the cylinder housing, the plurality of helical shaped passageways being in fluid communication with the cooling fluid.

12. The diesel engine of claim 8 wherein the cooling section passageway includes a cooling outlet which is adapted to receive the cooling fluid substantially tangential to the cooling section.

13. The engine of claim 8 including a fluid gap positioned between the thermal shield and the engine block to reduce heat transfer from the exhaust ports to the engine block.

14. A two-stroke engine which is powered by a combustion fluid, the engine comprising:

a tubular cylinder housing having a cylinder wall defining a cylinder chamber;

a pair of pistons positioned within the cylinder, the pistons being adapted to move between a first position in which the pistons are spaced apart and a second position in which the pistons are proximate each other, movement of the pistons between the first position and the second position being accompanied by a swirl in the cylinder chamber in a swirl direction; and a first injector which is adapted to inject the combustion fluid into the cylinder chamber between the pistons, the first injector being adapted to direct the combustion fluid in the cylinder chamber in substantially the swirl direction.

15. The engine of claim 14 wherein the first injector is adapted to direct the combustion fluid at between approximately a thirty degree (30°) angle and a eighty degree (80°) angle relative to a tangent of the cylinder housing at where the first injector enters the cylinder housing.

16. The engine of claim 14 wherein the first injector comprises a first hole and a second hold wherein the first hole is adapted to direct the combustion fluid at approximately a sixty degree (60°) angle and wherein the second hole is adapted to direct the combustion fluid at approximately an eighty degree (80°) angle relative to a tangent of the cylinder housing at where the first injector enters the cylinder housing.

17. The engine of claim 14 including a second injector positioned substantially opposite from the first injector in the cylinder housing, the second injector being adapted to direct the combustion fluid into the cylinder chamber in substantially the swirl direction.

18. A two-stroke cycle diesel engine comprising:

an engine block;

a tubular cylinder housing positioned within the engine block and including a cylinder wall which at least partly defines a cylinder chamber, the cylinder housing having a plurality of exhaust ports which extend through the cylinder wall to release exhaust fluid from the cylinder chamber;

a pair of opposed pistons positioned within the cylinder housing, the pistons being adapted to move between a first position in which the pistons are spaced apart and a second position in which the pistons are proximate each other, movement of the pistons between the first position and the second position being accompanied by a swirl in the cylinder chamber in a swirl direction;

a first injector which is adapted to inject the combustion fluid into the cylinder chamber between the pistons, the first injector is adapted to direct the combustion fluid in the cylinder chamber towards the swirl direction;

a thermal shield positioned between the exhaust ports and the engine block to thermally shield the engine block from the exhaust fluid;

a fluid gap positioned between the thermal shield and the engine block to thermally shield the engine block and reduce heat transfer between the exhaust fluid and the engine block; and a cooling passageway including a substantially annular cooling section which substantially encircles the cylinder housing and a coolant inlet which is adapted for delivering a cooling fluid substantially tangential to the cooling section.

19. The diesel engine of claim 18 wherein the cooling passageway includes a plurality of helical shaped passageways which substantially encircle at least a portion of the cylinder housing, the helical shaped passageways being in fluid communication with the cooling fluid.

20. The diesel engine of claim 18 wherein the cooling section includes a cooling outlet which is adapted to receive the cooling fluid substantially tangential to the cooling section.

* * * * *